United States Patent [19]

Hoshikawa

[11] Patent Number: 5,124,985
[45] Date of Patent: Jun. 23, 1992

[54] RADIOCOMMUNICATION SYSTEM USING TIME-DIVISION DIGITAL FRAMES

[75] Inventor: Toshiya Hoshikawa, Sendai, Japan

[73] Assignee: Small Power Communication Systems Research Laboratories Co., Ltd., Sendai, Japan

[21] Appl. No.: 447,104

[22] Filed: Dec. 6, 1989

[30] Foreign Application Priority Data

Dec. 13, 1988 [JP] Japan ................... 63-314579

[51] Int. Cl.[5] ............... H04B 7/212; H04B 7/26; H04J 3/16
[52] U.S. Cl. .................... 370/95.3; 370/29; 370/95.1; 455/34.1; 455/54.1
[58] Field of Search .............. 370/95.1, 95.3, 50, 370/70, 92, 77, 85.1, 85.7, 10, 100.1, 104.1, 105.1, 105.2, 110.1, 24, 29, 30, 32; 455/32, 33, 34, 53, 54, 56, 51; 379/58, 59, 62, 63; 340/825.52

[56] References Cited

U.S. PATENT DOCUMENTS

| | | | |
|---|---|---|---|
| 2,945,094 | 9/1954 | Metzger | 370/10 |
| 3,529,243 | 9/1970 | Reindl | 455/51 |
| 3,671,865 | 6/1972 | Szumila et al. | 455/51 |
| 4,231,114 | 10/1980 | Dolikian | 455/54 |
| 4,356,484 | 10/1982 | Eckhardt | 370/95.1 |
| 4,519,068 | 5/1985 | Kerbs et al. | 455/56 |
| 4,638,479 | 1/1987 | Alexis | 370/95.1 |
| 4,686,672 | 8/1987 | Namiki | 370/95.3 |
| 4,736,371 | 4/1988 | Tejima et al. | 370/95.1 |
| 4,748,621 | 5/1988 | Ballance et al. | 370/95.3 |
| 4,754,450 | 6/1988 | Lynk, Jr. et al. | 370/29 |
| 4,754,453 | 6/1988 | Eizenhofer | 370/95.1 |
| 4,763,322 | 8/1988 | Eizenhofer | 370/95.1 |
| 4,803,679 | 2/1989 | Shimizu | 370/95.1 |
| 4,850,030 | 7/1989 | Hashimoto et al. | 455/34 |
| 4,903,257 | 2/1990 | Takeda et al. | 370/29 |
| 4,914,649 | 4/1990 | Schwendeman et al. | 455/34 |
| 4,949,395 | 8/1990 | Rydbeck | 370/95.3 |
| 4,987,571 | 1/1991 | Haymond et al. | 370/95.3 |

FOREIGN PATENT DOCUMENTS 60-248039 5/1984 Japan .
WO89/10668 11/1989 PCT Int'l Appl. .

OTHER PUBLICATIONS

IEEE, vol. 75, No. 4, Apr. 1987 "Universal Digital Portable Radio Communications", face page and pp. 436–477.

Richard G. Saunders, "ULTRAPHONE—Wireless Digital Loop Carrier System", Proceedings of the National Communications Forum, Sep. 1988, pp. 1860–1866.

Pierre M. Hubert and Jacques Gaumond, "Canada Combines Voice, Data, and Images on National Satellite Network", *Data Communications*, vol. 13, No. 1, Jan. 1984, pp. 179–184.

Primary Examiner—Benedict V. Safourek
Assistant Examiner—Alpus H. Hsu
Attorney, Agent, or Firm—Volpe and Koenig

[57] ABSTRACT

A radiocommunication system comprising a base station and a plurality of terminal stations. The base station includes a transmitting section for arranging a plurality of digital frames on a time-division basis, assigning a channel number to each digital frame, and transmitting the time-division digital frames as a radio signal of a first frequency. Each terminal station includes a receiving section for receiving the radio signal transmitted from the transmitting section of the base station, and separating the time-division digital frames for each channel in accordance with the channel number.

16 Claims, 8 Drawing Sheets

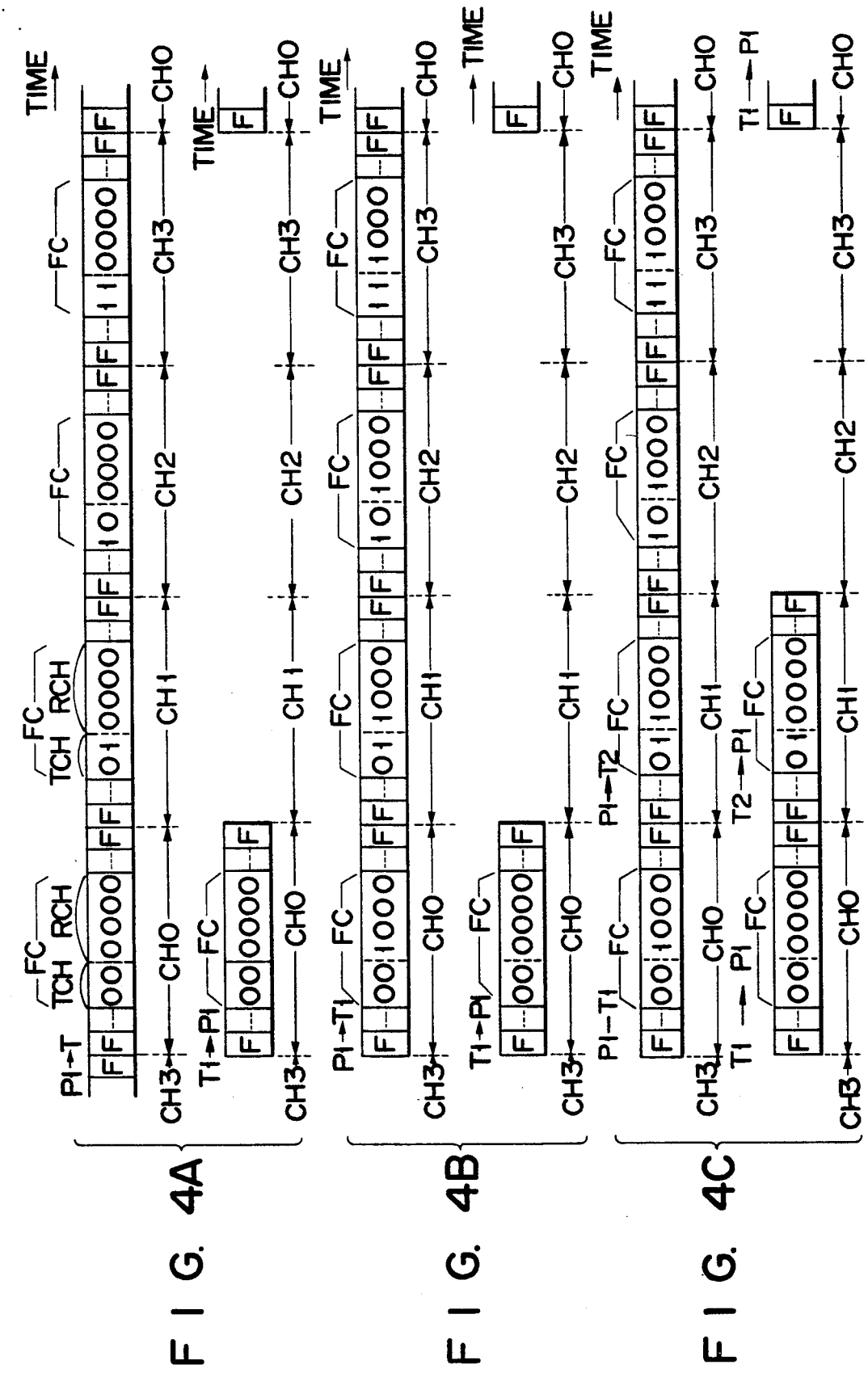

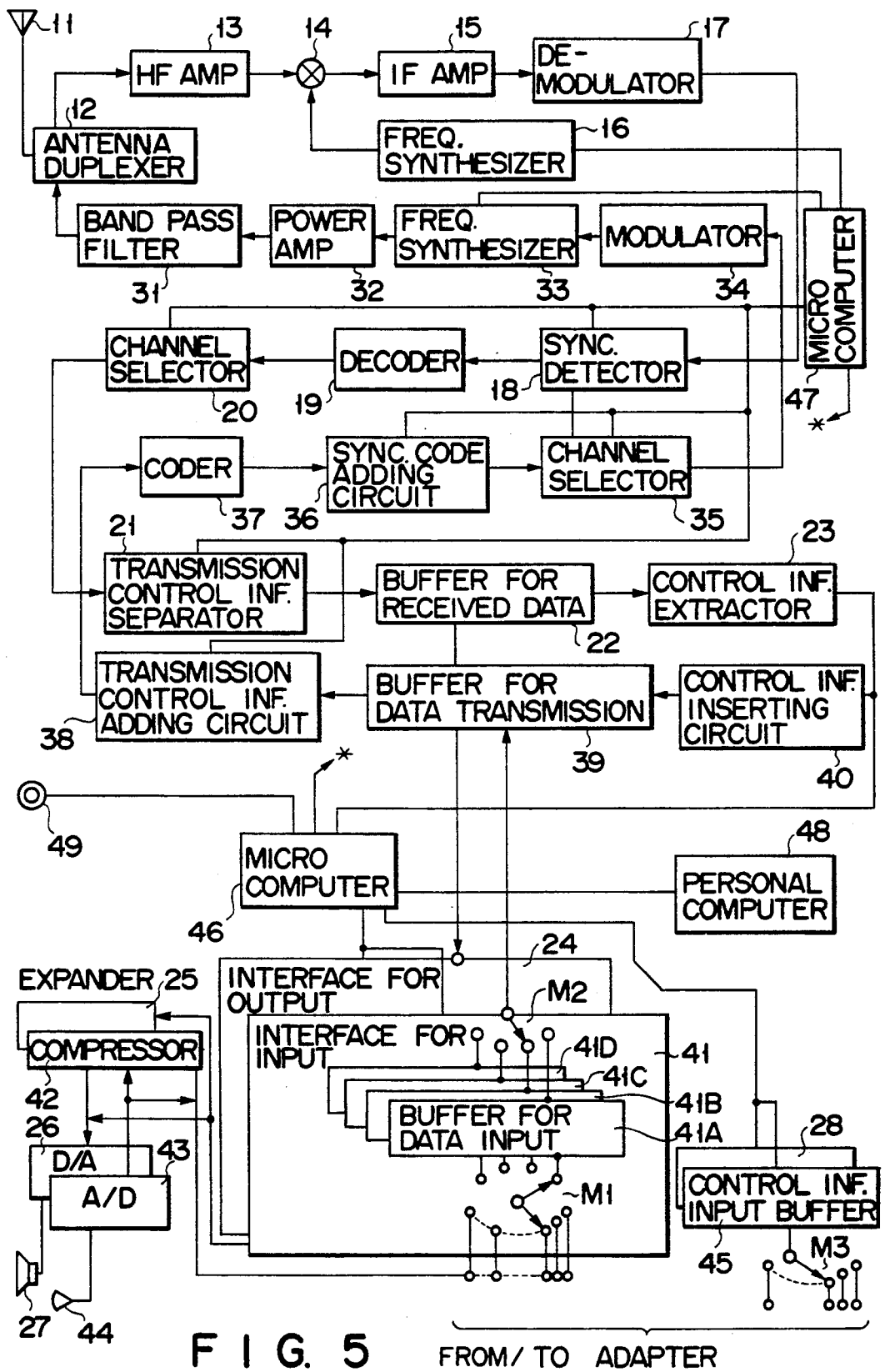
F I G. 5    FROM/TO ADAPTER

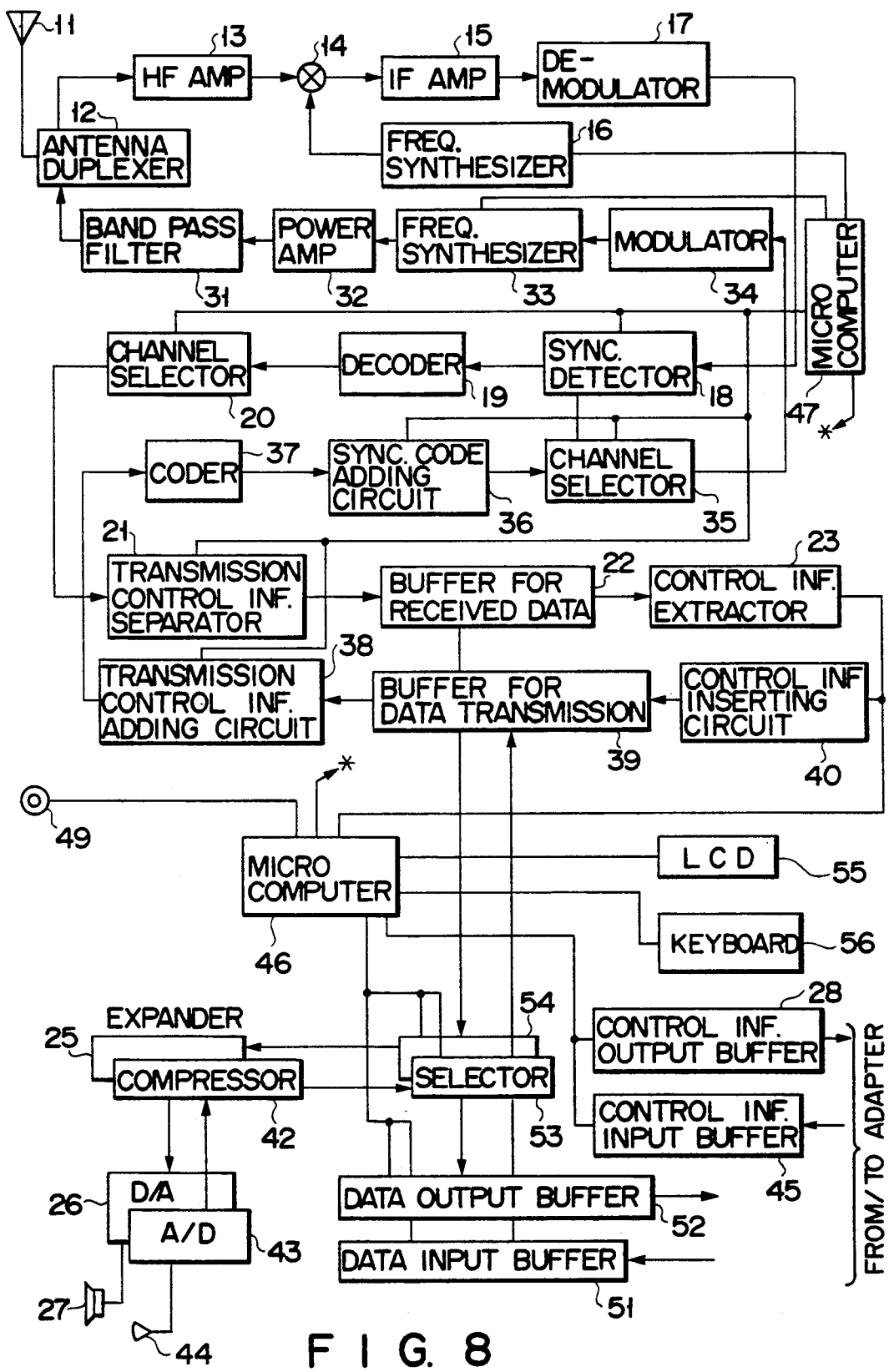
F I G. 8

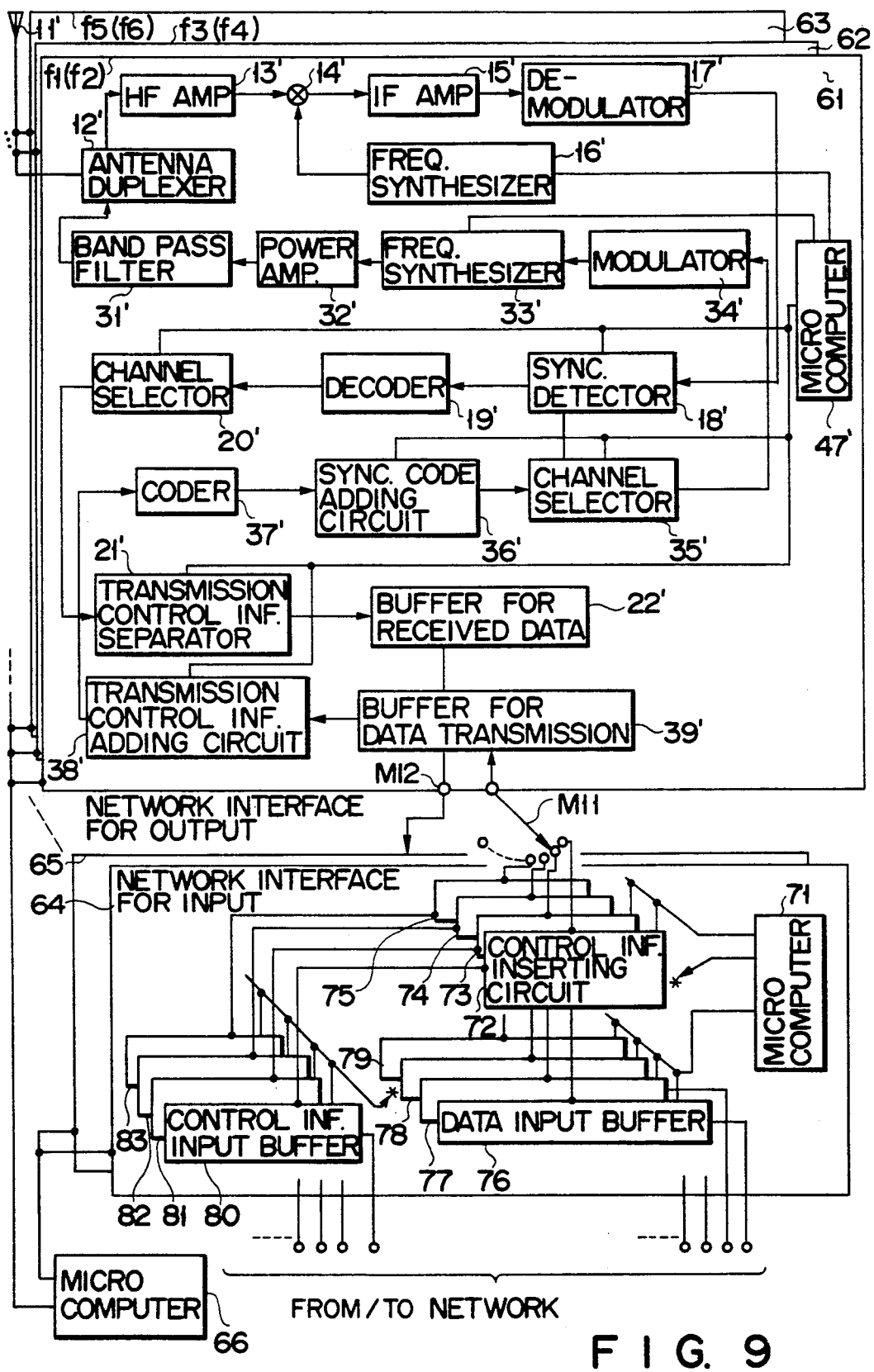
F I G. 9

RADIOCOMMUNICATION SYSTEM USING TIME-DIVISION DIGITAL FRAMES

BACKGROUND OF THE INVENTION

1. Field of the Invention

The present invention relates to a radiocommunication system and, more particularly, to a radiocommunication system using time-division digital frames.

2. Description of the Related Art

In general, in places where many people work, such as large office buildings, factory sites and hospitals, many employees do their respective tasks, at different sections. Each employee is engaged in a task with a transceiver, so that he or she may make contact with another employee, or the office, to exchange information if needed.

In such places, not only speech communication but also communication of digital data, such as image data, is frequently performed. Speech communication can be performed by transceivers carried by employees. On the other hand, digital data communication is carried out using communication equipment such as facsimile terminal equipment, data terminal equipment or computers, which are mutually connected through normal telephone lines or private data lines provided within office buildings and factory sites. Thus, for local communication in office buildings or factory sites, different communication equipment is needed for each type of information to be transmitted.

In the radiocommunication system of an office building or factory site, in order for many employees to communicate with a base station simultaneously, the number of required transmission frequencies must at least correspond to the number of employees. Hence, when the number of employees increases, the number of radio frequencies available in the radiocommunication system must also be increased. If the number of employees increases too much, however, the number of communication channels would be inadequate, and thus sufficient radiocommunication service could not be provided.

SUMMARY OF THE INVENTION

It is an object of the present invention to provide a radiocommunication system which permits radiocommunication of various types of digital information, such as speech, images and digital data, and realizes many communication channels by the use of a single radio frequency on a time-division basis.

According to the present invention there is provided radiocommunication system comprising: a first radiocommunication device having transmission section for adding channel identification information to each of a plurality of digital frames, arranging the digital frames on a time division basis and transmitting the time-division digital frames as a radio signal of a first frequency; and a second radiocommunication device having receiving section for receiving the radio signal transmitted from the transmitting means of the first radiocommunication device and separating the digital frames for each channel in accordance with the channel identification information.

In the radiocommunication system, channel identification information is added to each of a plurality of digital frames and the digital frames are transmitted on a time division basis as a radio signal of a first frequency. Thus, signals on a plurality of channels are transmitted simultaneously by the radio signal of the first frequency. Therefore, many communication channels are realized by the use of a same radio frequency band, permitting the effective use of frequencies.

In addition, proper selection of the number of channels to be transmitted simultaneously can achieve a desired data transmission rate. For this reason, the data transmission rate can be selected according to the type of data to be communicated. Further, by using the data for D channel of an integrated service digital network (ISDN) so as to fit the ISDN interface, another information can be transmitted simultaneously.

BRIEF DESCRIPTION OF THE DRAWINGS

FIGS. 4A through 4D are timing diagrams for explaining the operation of transmitting and receiving the time-division digital frame in the radiocommunication system shown in FIG. 3;

FIG. 5 illustrates in block form an example of a specific arrangement of radio terminal equipment used in the radiocommunication system shown in FIG. 3;

FIG. 8 illustrates in block form another specific arrangement of the radio terminal equipment used in the radiocommunication system of FIG. 3; and FIG. 9 is a block diagram of an example of the radio base station used in the radiocommunication syste of FIG. 3.

DETAILED DESCRIPTION OF THE PREFERRED EMBODIMENTS

First, some uses of the radiocommunication system of the present invention will be described.

As described above, in large office buildings, hospitals, factory sites and other places where many personnel work, communication of a large amount of information is required at all times. The radiocommunication system of the present invention is intended to realize communication at such places by means of portable or easily carried radio transmitter-receivers. At such places, communication of image data from facsimile terminal equipment, and digital data from data terminal equipment and computer equipment, as well as communication by speech, is performed frequently. Such communication is effected through normal telephone lines or private data lines at present, and exclusive communication equipment is utilized exclusively, for each type of data. The radiocommunication system of the present invention is intended to realize a digital version of such communication equipment and permit wireless communication between communication apparatuses.

The digital version of communication equipment and wireless communication would have a great effect on the promotion of the efficiency and facility of work in large office buildings, hospitals, factory sites and another places. For example, in hospitals, diagnostic data could be written into or read from a computer system easily and instantly as well as speech communication. In factories, the transmission of control data to a malfunctioning device situated in a dangerous place, and the reception of monitor data related to the operation of the malfunctioning device could be effected easily and safely. When applied to the integrated service digital network (ISDN), the radiocommunication system of the present invention permits transmission of simple moving images, thus enabling a portable telephone and television conference system to be realized.

Figure 1:
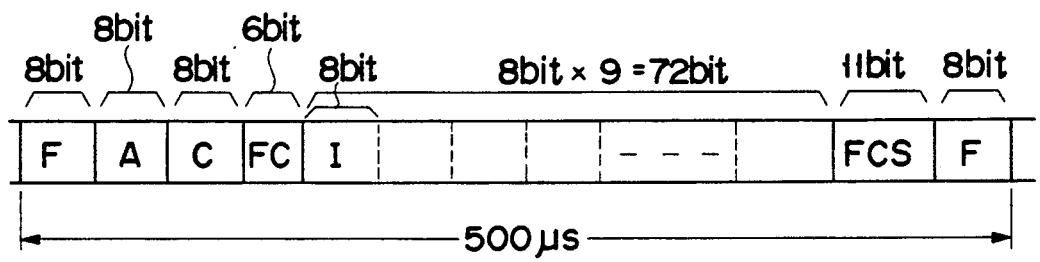
FIG. 1 illustrates a time-division digital frame used with a radiocommunication system of the present invention.

Referring now to FIG. 1, a time-division digital frame, which is used with the radiocommunication system according to the invention and conforms to HDLC (High Level Data Link Control procedure), comprises bit and frame synchronization fields F, an address field A, a control field C, a frame count field FC, a transmit information field I and a frame check and correct sequence field FCS. The bit and frame synchronization field F, address field A and control field C contain eight bits each. The frame count field FC contains six bits. The transmit information field I contains nine data blocks each of eight bits (one byte). The frame check and correct sequence field FCS contains 11 bits.

The digital frame is 121 bits in length and has a cycle of 500 $\mu$s. The bit rate of the digital frame is thus 242 Kbits per second where no time division is used. For error correction of the digital frame data, use is made of a fire code (M=4, code length=105 bits, information bit length=94 bits, error correcting capability=4 bits).

Note that, instead of using the fire code, a block code or convolution code may be used as an error correction code. In such a case, however, the code length and the error correcting capability will be different.

Next, the function of each field of the digital frame will be described.

Bit and frame synchronization field F

The bit and frame synchronization field F is a bit sequence used to establish synchronization and the start and finish of a digital frame and is inserted at the beginning and end of the frame. One of the synchronization field F positioned at the end of the preceding frame, and the synchronization field F positioned at the start of the next frame, may be omitted to use the remaining field for both frames because digital frames are transmitted continuously. The bit and frame synchronization frame F may have a bit pattern of, for example, "01111110". Also, a bit pattern such as "1010 . . . " and a frame synchronization pattern of a PN code or the like may be combined for use as the bit and frame synchronization field F.

Address field A

Address field A contains information representing a source address and a destination address of a time-division digital frame. In the present embodiment, of eight bits of address field A, the high-order two bits are used for an address to identify base station equipment and the low-order six bits are used for an address to identify a radio terminal equipment unit. If the address field A needs more than eight bits, it may be expanded according to the number of the base station and radio terminal units involved in the radiocommunication system, or a part of the information field I may be used for transmission of address information.

Control Field C

The control field C is a bit sequence adapted for transmission of control information between the base station unit and a radio terminal unit and contains control information conforming to HDLC.

Frame count field FC

The frame count field FC is a bit sequence adapted to use digital frames on a time-division basis. A specific arrangement of the frame count field FC will be described below with reference to FIG. 2.

Figure 2:
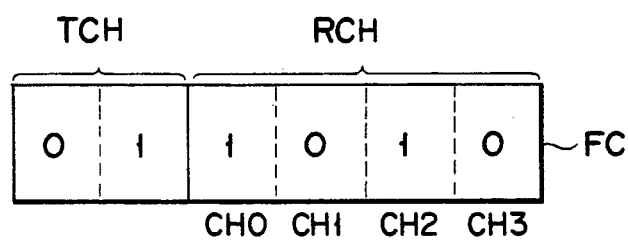
FIG. 2 illustrates the contents of a frame count field included in the digital frame of FIG. 1.

As shown in FIG. 2, the frame count field FC contains 2-bit transmission channel identification information TCH representing the channel number of a digital frame to be transmitted. The 2-bit transmission channel identification information TCH is a binary code for representing any of channel 0 to channel 3 over which a digital frame is transmitted between the base station and a terminal unit.

The frame count field FC further contains 4-bit free channel identification information RCH for identifying a busy condition of each of the four channels 0 to 3 which are used for transmission from terminal units to the base station. The four bits of the free channel identification information RCH represent, from left to right, the busy condition of the channel 0 (CH0), channel 1 (CH1), channel 2 (CH2) and channel 3 (CH3). The free channel identification information RCH is set by the base station. For example, a "1" is set in a bit position corresponding to a busy channel and a "0" is set in a bit position for a free channel.

The free channel identification information RCH is used in order for the base station to inform each of the terminal units of a free channel or free channels. Hence, each digital frame transmitted from the base station to terminal units contains both the transmission channel identification information TCH and free channel identification information RCH. On the other hand, digital frames transmitted from terminal units to the base station may contain only the transmission channel identification information TCH. That is, the free channel identification channel RCH is not necessarily required. Where the number of channels is increased to eight, each of the transmission channel identification information TCH and the free channel identification information RCH has three bits. The 3-bit free channel identification information RCH is used to indicate the first free channel. In this case, the rate of transmission on each channel will be 18 Kbits per second.

In the frame count field FC of FIG. 2, the transmission channel identification information TCH is set to "01" and the free channel identification information RCH is set to "1010". The "01" of the transmission channel identification information TCH means that a digital frame containing this information belongs to the channel 1 (CH1) and the "1010" of the free channel identification information RCH indicates that the channel 0 (CH0) is busy, the channel 1 (CH1) is not busy, the channel 2 (CH2) is busy and the channel 3 (CH3) is not busy in communication between terminal units and the base station.

Transmit information field I

The transmit information field I is a bit sequence of information to be transmitted, and is comprised of nine blocks, each of eight bits (one byte). When, therefore, digital data is transmitted using all four channels and all the nine blocks of the transmit information field I for each channel, the information transmission rate will be given by 8 (bits)×9 (blocks)×5 (μs)×$10^2$=144 Kbits per second. This transmission rate is adapted to 2B+D (64 Kbits/s×2+16 Kbits/s=144 Kbits/s) regulated as the international standardized interface in the integrated services digital network (ISDN). Here one of nine blocks is provided for D channel of ISDN. As a concrete example, 64 Kbits/s×2 =128 Kbits/s (B channel) may be used for transmission of moving images and speech, and 16 Kbits/s (D channel) may be used for transmission of still images (facsimile images), to thereby permit simultaneous transmission of moving images, speech and still images.

The standard information transmission rate in normal data transmission over telephone lines is 64 Kbits/s. Such a transmission rate can be achieved by using two channels of the four channels and transmitting a transmit information field I having a total of 16 blocks on the two channels. In this case, it will be possible to use the remaining two blocks, each provided for the D channel, for communication of control information between the terminal unit and the network, or communication between terminal units.

For transmission of band-compressed information of speech or the like at a transmission rate of 32 Kbits/s, a single channel will suffice. Also, another data transmission can be made simultaneously with 4 Kbits/s, accommodating the D channel.

In this way, information transmission at a transmission rate of 144 Kbits/s or less can be achieved by the selective use of the four channels. In this case, the information transmission rate per channel is 32 Kbits/s+4 Kbits/s. To use two channels or more for high speed transmission of a piece of information, it is required to use channels which are continuous in time.

Frame check and correct sequence FCS

The frame check and correct sequence FCS is a bit sequence for detecting and correcting errors in data transmission and is composed of an 11-bit fire code in the present embodiment. The range of correction of errors by the fire code is all the bits in the digital frame data except for the bit and frame synchronization fields F.

The principle of radiocommunication using the digital frame of FIG. 1 will be described below with reference to FIG. 3.

Figure 3:
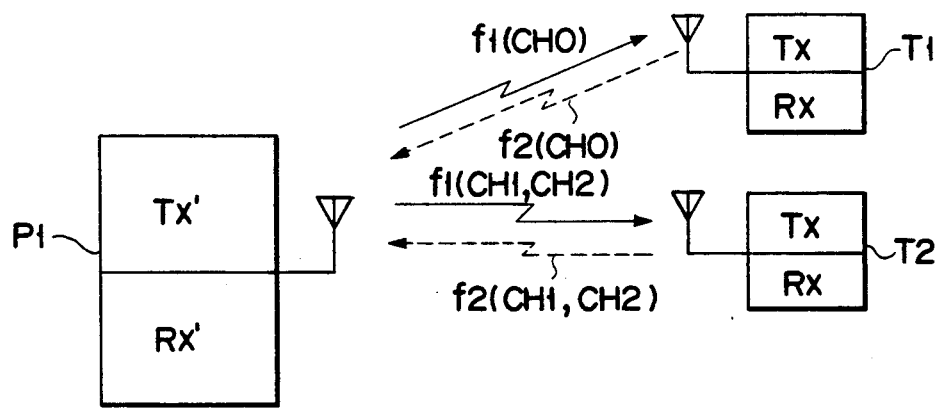
FIG. 3 is a schematic diagram illustrating the communication principle of a radiocommunication system according to an embodiment of the present invention.

In FIG. 3 is illustrated a radiocommunication system comprising a base station unit P1 and two radio terminal units T1 and T2. Each of the terminal units T1 and T2 is provided with a radio transmitter unit Tx and a radio receiver unit Rx. Base station unit P1 has a radio transmitter unit Tx' and a radio receiver unit Rx'.

Here there is illustrated a case where a single frequency is used for transmission and a single frequency for reception, that is, a carrier frequency of f1 is used for transmission from the base station to the terminal units and a carrier frequency of f2 is used for transmission from the terminal units to the base station.

By way of example, in FIG. 3, a two-way communication is carried out between base station P1 and terminal unit T1 via channel 0 (CH0), and a two-way communication is carried out between base station P1 and terminal unit T2 via channel 1 (CH1) and channel 2 (CH2).

Next, with reference to FIGS. 4A through 4D, a description will be given of the process of request-to-call from each of terminal units T1 and T2 to base station P1 and the process of response from base station P1 to each of terminal units T1 and T2, which are required to permit two-way communication between base station P1 and each of terminal units T1 and T2.

Base station P1 always transmits a radio signal of a carrier frequency of f1 to each of terminal units T1 and T2 to enable them to establish bit and frame synchronization even when actual information transmission is not made. The digital frame transmitted by the radio signal is shown in FIG. 4A.

Figure 4D:
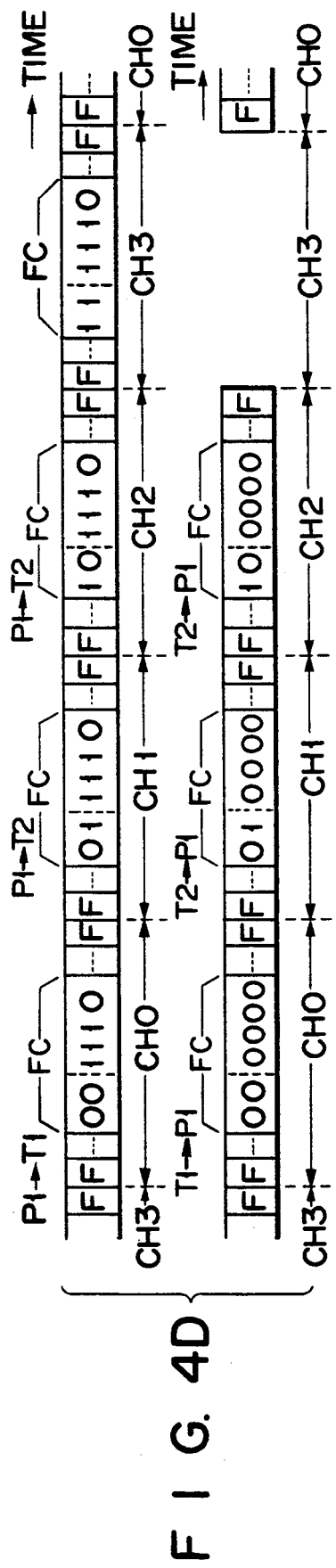

As shown in FIG. 4A, base station P1 repeatedly transmits four time-division digital frames corresponding to respective channels CH0 to CH3 in sequence. In this case, the frame count fields FC of the four digital frames have their high-order two bits, or transmission channel identification information TCH, set to "00", "01", "10" and "11" corresponding to channels CH0 to CH3. The low-order four bits of the frame count field FC of each digital frame, namely, the free channel identification information RCH, is set to "0000". This means that all the channels CH0 to CH3 are not used at carrier frequency f1 transmitted from base station P1 to terminal units T1 and T2, and at carrier frequency f2 transmitted from terminal units T1 and T2 to base station P1. As shown in FIGS. 4A to 4D, in carrier frequencies f1 and f2, the same channel number is assigned to the digital frames in the same time-slot.

To transmit time-division digital frames, each of terminal units T1 and T2 establishes bit and frame synchronization on the basis of the digital frames sent from base station P1, and detects unused channels on the basis of the free channel identification information RCH in the received digital frames. Each of terminal units T1 and T2 sends a request-to-call to base station P1 using a detected unused channel.

Subsequently the request-to-call operation of each terminal unit will be described on the assumption that the request-to-call is made in the order of terminal units T1 and T2.

Where terminal unit T1 makes a request-to-call using channel CH0 of the four unused channels CH0 to CH3, such time-division digital frames as shown in FIG. 4A are transmitted as a radio signal of carrier frequency f2. In this case, as shown in FIG. 4A, digital frames corresponding to channel CH0 are transmitted. The address field A and the control field C of the digital frame stores the address of terminal unit T1 and the request-to-call information, respectively. In this case, the digital frame of channel CH0 having a time length of 500 μs is repeatedly transmitted at intervals of 500 μs×3 which is assigned to transmission of three digital frames for channels CH1 to CH3.

Responsive to the request-to-call from terminal unit T1, base station P1 transmits such digital frames as are shown in FIG. 4B to terminal unit T1 as a radio signal of carrier frequency f1. In this case, the free channel identification information RCH contained in each of the digital frames is "1000". This is because the channel CH0 for the carrier frequency f2 is used by terminal unit T1. Terminal unit T1 makes a determination as to whether or not the digital frame from base station P1 is addressed to it, on the basis of the contents of the address field in the digital frame.

On the basis of the contents "1000" of the free channel identification information RCH contained in digital frame data transmitted from base station P1 to terminal unit T1, terminal unit T2 detects that channels CH1 to CH3 are unused. Alternatively, terminal unit T2 may do such a detection based on the radio signal of carrier frequency of f2 being transmitted from terminal unit T1. Terminal unit T2 thus makes a request-to-call through channel CH1, for example. In this case, only one digital frame corresponding to channel CH1 is transmitted from terminal unit T2 to base station P1 as a radio signal of carrier frequency f2. Therefore, as shown in FIG. 4C, digital frames corresponding to channel CH0 are transmitted from thermal unit T1, and digital frames corresponding to channel CH1 are transmitted from terminal T2.

Afterward, as is the case with terminal unit T1, communication of control information is effected between terminal unit T2 and base station P1. Channels CH1 and CH2 are assigned to the communication between terminal unit T2 and base station P1.

FIG. 4D illustrates the final state of communication between terminal units T1, T2 and base station P1.

In this way two-way communication is performed between terminal units T1, T2 and base station P1 using a pair of carrier frequencies f1 and f2. For request-to-receive from base station P1 to a terminal unit, the terminal unit number is stored in the address field A and request-to-receive information is stored in the control field C in a digital frame of carrier frequency f1. Depending on traffic volume, other carrier frequencies (f3, f4, . . . f2n) may be used for transmission between the base station and terminal units. In this case, communication of control information between the base station and terminal units is effected using f1 and f2, and the frequency channel assignment at the time of actual data transmission is carried out in the order of frequencies other than f1 and f2.

FIG. 5 illustrates an example of a specific arrangement of the terminal units T1 and T2 shown in FIG. 3. The terminal unit is arranged to achieve a maximum transmission rate of 144 Kbits/s using any number of channels within the four channels CH0 to CH3. The receiver Rx of the terminal unit includes a high-frequency amplifier 13, a mixer 14, an intermediate-frequency amplifier 15, a frequency synthesizer 16, a demodulator 17, a synchronous detector 18, a decoder 19, a channel selector 20, a transmitting and receiving control information separator 21, a receive data buffer 22, a control information extractor 23, an output interface 24, a band expander 25, a speech analog to digital converter 26, a loudspeaker 27 and a control information output buffer 28. The transmitter Tx of the terminal unit comprises a bandpass filter 31, a power amplifier 32, a frequency synthesizer 33, a modulator 34, a channel selector 35, a synchronization code adding circuit 36, a coder 37, a transmission/reception control information adding circuit 38, a transmit data buffer 39, a control information inserting circuit 40, an input interface 41, a band compressor 42, a speech analog to digital converter 43, a microphone 44 and a control information input buffer 45. The terminal unit further comprises a transmitting and receiving antenna 11, an antenna duplexer 12, a data-flow controlling microcomputer 46, a transmission/reception controlling microcomputer 47, a personal computer 48 and an emergency command switch 49.

The control information corresponds to the D channel of 2B+D in the ISDN interface, and is stored in the end block (one byte) of the transmit information field I. The control information is used for communication between the base station and a terminal unit, for communication between a terminal unit and the network which connected to the base station, or for data transmission between terminal units.

The operation for transmission from the terminal unit will be described first.

Speech input is applied to analog to digital converter 43 via microphone 44 for conversion to a digital signal. The digital speech signal is applied to input interface 41 either directly or via band compressor 42. Digital data such as moving image data, on the other hand, is applied from an adapter to input interface 41 directly.

In input interface 41, multiplexer M1 selects the speech signal and any one of several pieces of digital data for various applications. The selected digital data, including the speech data, are stored in data input buffers 41A to 41D selected by multiplexer M1. The selecting operation of multiplexer M1 is controlled by microcomputer 46. For example, for data transmission using only channel CH0, digital data is stored only in digital input buffer 41A. When all the four channels CH0 to CH3 are used, digital data are sequentially stored in all four data input buffers 41A to 41D. Data input buffers 41A to 41D are sequentially selected by multiplexer M2 so that data stored in buffers 41A to 41D are sequentially transferred to data transmission buffer 39.

Control information to be transmitted from the adapter to a terminal unit is stored in control information input buffer 45 via multiplexer M3. The control information stored in buffer 45 is transferred to data transmission buffer 39 via microcomputer 46 and control information inserting circuit 40. Buffer 39 converts the digital data from input interface 41 and the control information from control information inserting circuit 40 from parallel form to serial form. The serial digital data and control information are applied to transmission/reception information adding circuit 38 as the transmit information field I described above. In this case, the control information is incorporated in the transmit information field I as the final byte data.

The data applied from data transmission buffer 39 to control information adding circuit 38 as the transmit information field I is added at the head thereof with information corresponding to address field A, information corresponding to control field C and information corresponding to frame count field FC. The process of adding information in control information adding circuit 38 is executed under the control of microcomputer 47. Output data of transmission/reception control information adding circuit 3 is added with control information of frame check and correct sequence FCS in coder 37 and then sent to synchronization code adding circuit 36. In circuit 36, a synchronization code corresponding to bit and frame synchronization field F is added to the data from coder 37. As a result, digital frame data of such a frame arrangement as shown in FIG. 1 is produced.

The digital frame data is sent to channel selector 35 at a given time corresponding to a channel to which the data belongs, and then transferred to modulator 34. Modulator 34 modulates a carrier signal of frequency f2 generated by frequency synthesizer 33 with the digital frame data, whereby, the digital frame data is carried on the carrier signal of frequency f2. Frequency synthesizer 33 is controlled by microcomputer 47 so that its oscillating frequency can be set to any one of a number of predetermined frequencies. The modulated carrier signal is applied to antenna 11 via power amplifier 32, bandpass filter 31 and antenna duplexer 12 for transmission to base station P1 as a radio signal of carrier frequency f2.

Next, the receiving operation of the terminal unit will be described.

A radio signal of carrier frequency f1 transmitted from base station P1 is received by antenna 11 of the terminal unit. The received signal is amplified by high-frequency amplifier 13 and then applied to mixer 14, which mixes the output signal of amplifier 13 and an output signal of frequency synthesizer 16, to produce an intermediate-frequency signal. The frequency of the output signal of frequency synthesizer 16 is controlled by microcomputer 47. The intermediate-frequency signal is amplified by intermediate-frequency amplifier 15 and then applied to demodulator 17, which recovers digital data from the intermediate-frequency signal.

The recovered digital data is applied to synchronous detector 18 where a bit pattern of the bit and frame synchronization field F, contained in the digital frame, is detected. Consequently, the bit and frame positions are confirmed so that the digital frame with a frame arrangement as shown in FIG. 1 is derived. During the process of decoding in decoder 19, the process of detecting and correcting errors is executed on the basis of the contents of frame check and correct sequence field FCS contained in the digital frame. Next, the digital frame is entered into channel selector 20 at a given time corresponding to the channel to which the data belongs, then transferred to transmission/reception control information separator 21. Separator 21 separates information corresponding to address field A, information corresponding to control field C, information corresponding to frame count field FC. If information related to control from the digital frame is contained in transmit information field I, it is separated from the digital frame by separator 21. The separated information is sent to microcomputer 47, and the data corresponding to transmit information field I in the digital frame is stored in received data buffer 22, which converts the input data from serial data to parallel data. The final byte data in transmit information field I is extracted from received data buffer 22 by control information extractor 23, and the extracted data is then sent to and stored in control information output buffer 28 via microcomputer 46, then transferred to the adapter.

On the other hand, data other than the final byte data in transmit information field I is transferred from received data buffer 22 to output interface 24. Output interface 24 has four data output buffers (not shown) corresponding to channels CH0 to CH3 and first and second multiplexers (not shown). The data other than the final byte data in transmit information field I is sequentially stored in data output buffers selected by the second multiplexer. The selecting operation of the second multiplexer is controlled by an joint operation of microcomputers 46 and 47.

When the data stored in the data output buffers of output interface 24 corresponds to a speech signal, it is applied to digital to analog converter 26 either directly or via band expander 25. An analog signal obtained from digital to analog converter 26 is converted into sound by loudspeaker 27. On the other hand, if the data stored in the output buffers of output interface 24 corresponds to digital data for external equipment, for example moving image data, it is directly transferred to the adapter. If the data is for the personal computer 48, it is sent to the personal computer via microcomputer 46.

The frame count field FC of the digital frame transmitted from base station P1 contains free channel identification information RCH as well as channel identification information TCH. Free channel identification information RCH is processed by microcomputers 46 and 47. The user can execute various types of controls using the keyboard and display facility of microcomputer 48.

As described above, in the terminal unit shown in FIG. 5, digital frames are transmitted on a time division basis using frame count field FC at the time of transmission, and separation of the time-division digital frames is carried out using frame count field FC at the time of reception. Emergency command switch 49 is provided to read, upon actuation, required information, such as destination numbers, previously stored in a ROM of microcomputer 46, and to start sending operation of the terminal unit instantly.

Next, specific arrangements of transmission/reception control information adding circuit 38, coder 37, synchronization code adding circuit 36 and channel selector 35 of the terminal unit shown in FIG. 5 will be described below with reference to FIG. 6.

Figure 6:
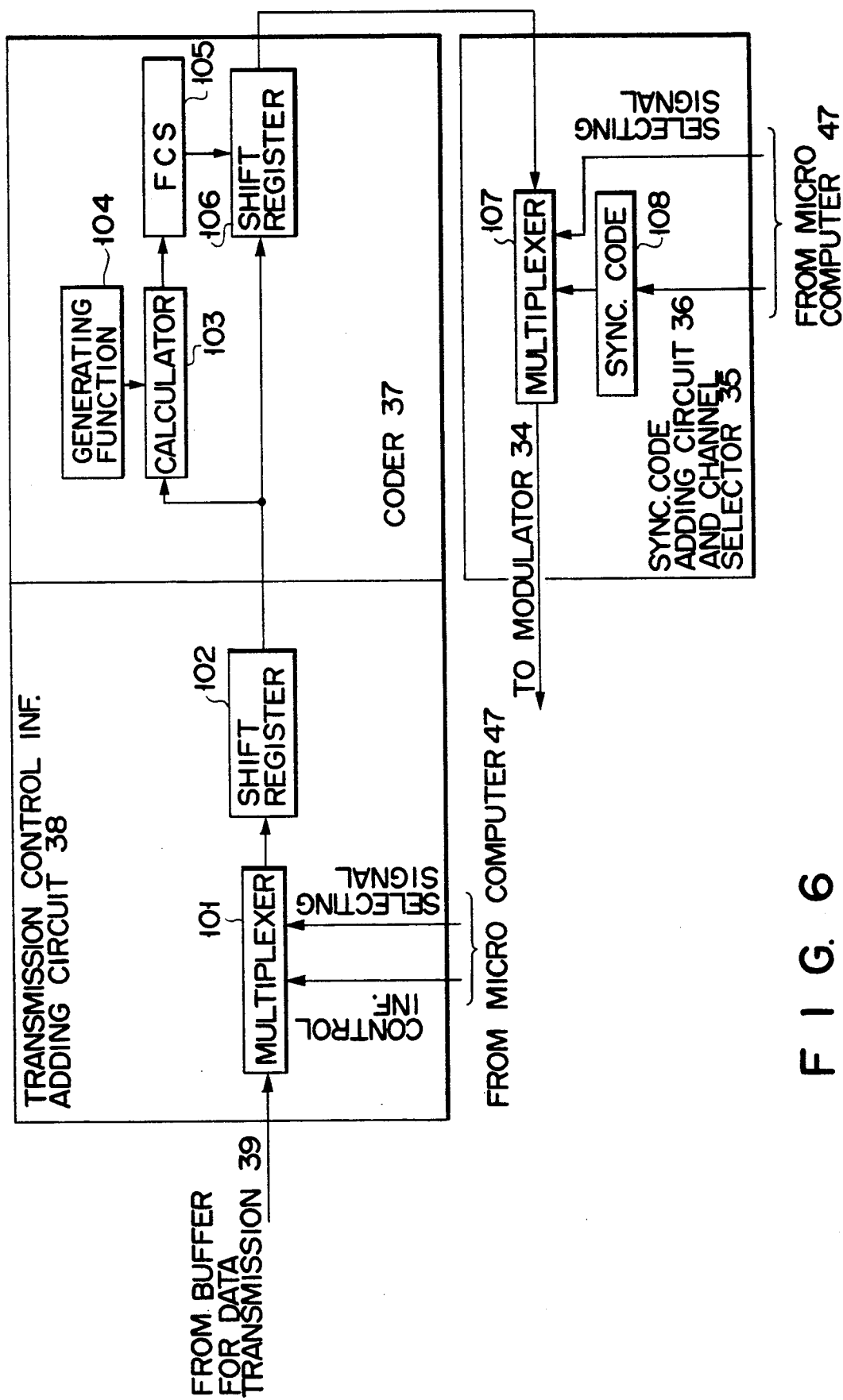
FIG. 6 is a block diagram of the main part of the transmitting circuit of the radio terminal equipment shown in FIG. 5.

As shown in FIG. 6, transmission/reception control information adding circuit 38 comprises a multiplexer 101 and a shift register 102. Transmission control information from microcomputer 47, and transmit information field I from data transmission buffer 39, are sequentially applied to multiplexer 101. The transmission/reception control information contains information corresponding to address field A, information corresponding to control field C and information corresponding to frame count field FC. Multiplexer 101 is further supplied with a selecting signal from microcomputer 47. Responsive to the selecting signal, multiplexer 101 sequentially outputs the transmission/reception control information and the transmit information field I so as to load them into shift register 102. Consequently the transmit information field I is loaded into shift register 102 with the transmission/reception control information added. If the transmit information field I is to contain information related to control, the information will be sent from microcomputer 47.

Coder 37 comprises an arithmetic circuit 103, a generating function storage unit 104, a frame check and correct sequence storage unit 105 and a shift register 106. Arithmetic circuit 103 carries out an arithmetic operation to generate a frame check and correct sequence field FCS corresponding to the contents of data stored in shift register 102, in accordance with a generating function of, for example, a fire code stored in generating function storage unit 104 beforehand. The frame check and correct sequence field FCS generated by arithmetic circuit 103 is stored in frame check sequence storage unit 105. Shift register 106 adds the frame check sequence field FCS to output data from shift register 102.

Synchronization code adding circuit 36 and channel selector 35 comprise a multiplexer 107 and a synchronization code storage 108. A code of bit and frame synchronization field F is previously stored in synchronization code storage 108. Responsive to a selecting signal from microcomputer 47, multiplexer 107 sends to modulator 34 the output of synchronization code storage 108, the output of shift register 106 and the output of synchronization code storage 108, in that order. As a result, the output of shift register 106 is supplied from multiplexer 107 to modulator 34 with bit and frame synchronization fields F added.

Next, specific arrangements of demodulator 17, synchronous detector 18, decoder 19, channel selector 20 and transmission control information separator 21 of the terminal unit shown in FIG. 5 will be described below with reference to FIG. 7.

Figure 7:
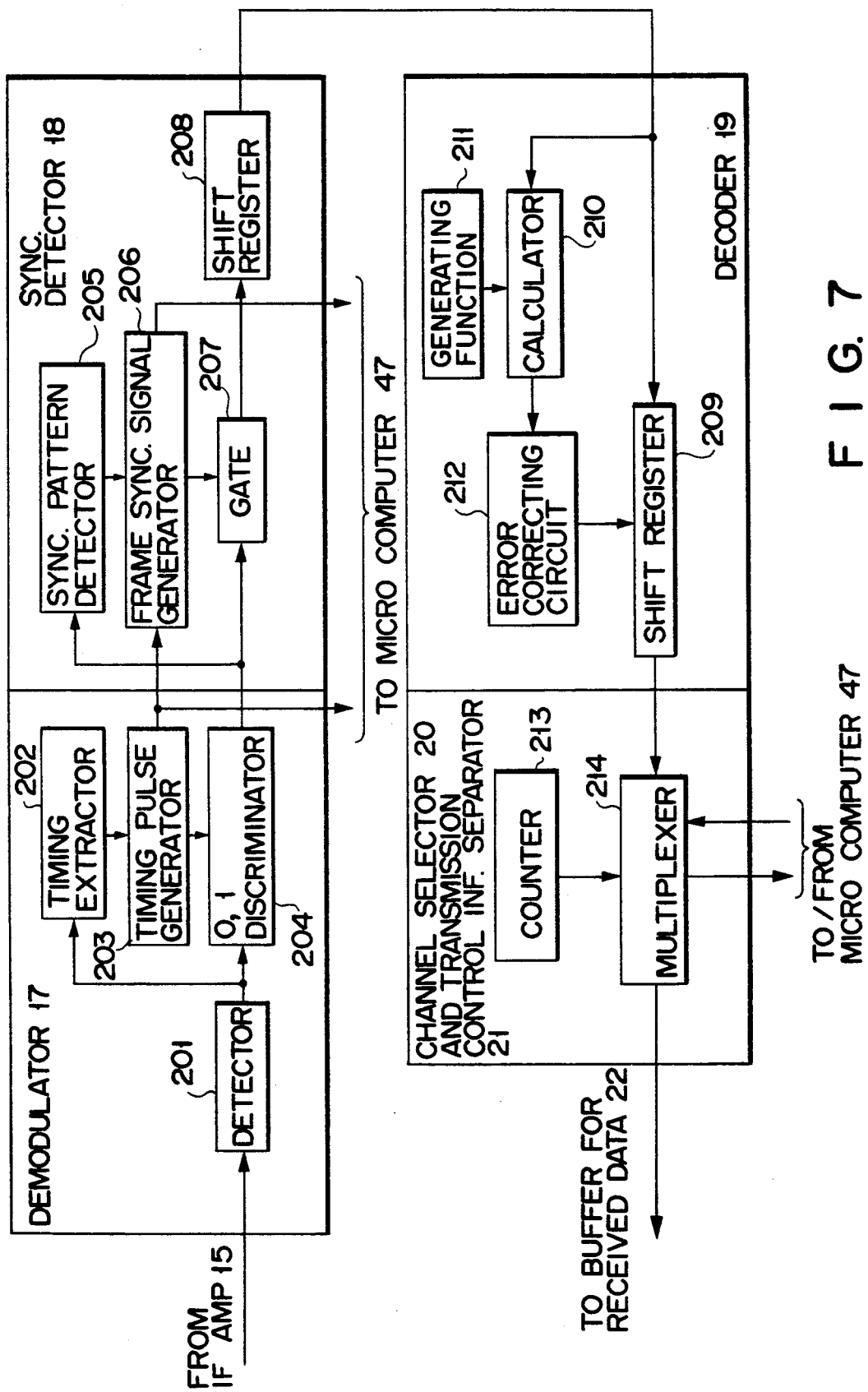
FIG. 7 is a block diagram of the main part of the receiving circuit in the radio terminal equipment shown in FIG. 5.

As shown in FIG. 7, demodulator 17 comprises a detector 201, a timing extractor 202, a timing pulse generator 203 and a discriminator 204. Detector 201 detects the output signal of intermediate-frequency amplifier 15, then outputs a signal to timing extractor 202 and discriminator 204. Timing extractor 202 extracts timing signals from the output signal of detector 201, which are then applied to timing pulse generator 203 to produce predetermined timing pulses. Discriminator 204 determines whether the output of detector 201 is either at logic 1 or at logic 0. This operation is carried out synchronously with the timing pulses from timing pulse generator 203. By means of such a discriminating operation, digital data is output from discriminator 204.

Synchronous detector 18 comprises a synchronization pattern detector 205, a frame synchronization signal generator 206, a gate circuit 207 and a shift register 208. Synchronization pattern detector 205 detects whether or not the bit and frame synchronization field F contained in the digital data from discriminator 204 coincides with a predetermined pattern. Frame synchronization signal generator 206 generates a start signal of a frame and, after synchronization pattern detection, counts timing pulses from timing pulse generator 203 so as to generate a frame synchronization signal for each frame of digital data. Upon generation of the frame synchronization signal, gate circuit 207 transfers digital data (105 bits) from discriminator 204 to shift register 208. By means of such a gating operation, a predetermined number of bits of digital data are stored in shift register 208.

Decoder 19 comprises an arithmetic circuit 210, a generating function storage 211, an error correcting circuit 212 and a shift register 209. Digital data stored in shift register 208 is transferred to shift register 209 and arithmetic circuit 210. Arithmetic circuit 210 performs an arithmetic operation for detecting bit errors of the digital data in accordance with the generating function in generating function storage 211. Error correcting circuit 212 corrects the data in shift register 209 on the basis of the results of the arithmetic operation executed by arithmetic circuit 210. By means of such an error correcting process, correct data can be output from shift register 209.

Channel selector 20 and transmission/reception control information separator 214 comprise a counter 213 and a multiplexer 21. Multiplexer 214 is controlled by a selecting signal from microcomputer 47 and a count value of counter 213, so as to separate the data received from shift register 209 into transmission/reception control information and transmit information. The transmission/reception control information, namely, information of address field A, information of control field C, and information of frame count field FC are supplied to microcomputer 47. If information related to control is contained in transmit information field I, it is also supplied to microcomputer 47. The transmit information, namely, data of transmit information field I is supplied to received data buffer 22.

A second embodiment of the terminal unit will be described with reference to FIG. 8. The terminal unit of FIG. 8 is arranged so as to use only one of the four channels CH0 to CH3. This terminal unit is different from the terminal unit of FIG. 5 in that a data input buffer 51 and a selector 53 are provided in place of input interface 41 of FIG. 5 and a data output buffer 52 and a selector 54 are provided in place of output buffer 24 of FIG. 5. Moreover, for miniaturization purposes, the terminal unit is provided with a liquid crystal display 55 and a keyboard 56 in place of the personal computer 48 of FIG. 5.

Selector 53 selects either data stored in data input buffer 51 from the adapter, or band-compressed speech data from band compressor 42 for transmission to data transfer buffer 39. Selector 5 transmits data stored in received data buffer 22 to band expander 25 when it is speech data, and to data output buffer when it is data for the adapter. Transmit and receive data may be transmitted to microcomputer 46.

Display 55 visually displays transmit data from keyboard 56 and receive data, which are both stored in microcomputer 46. The contents of various types of control instructed on keyboard 56 are also temporarily displayed.

The terminal unit of this embodiment permits no data transmission using plural channels, but can select a desired channel for use.

Next, an example of a specific arrangement of base station P1 shown in FIG. 3 will be described with reference to FIG. 9. Base station P1 comprises a transmitter-receiver unit 61 for a first set of transmit and receive radio signals of carrier frequencies f1 and f2, a transmitter-receiver unit 62 for a second set of transmit and receive radio signals of carrier frequencies f3 and f4, and a transmitter-receiver unit 63 for a third set of transmit and receive radio signals of carrier frequencies f5 and f6. Additions can be made to carrier frequencies. As is the case with the terminal unit of FIG. 5, each of transmitter-receiver units 61, 62 and 63 comprises an antenna duplexer 12', a high-frequency amplifier 13', a mixer 14', an intermediate-frequency amplifier 15', a frequency synthesizer 16', a demodulator 17', a synchronous detector 18', a decoder 19', a channel selector 20', a transmission/reception control information separator 21', a receive data buffer 22', a bandpass filter 31', a power amplifier 32', a frequency synthesizer 33', a modulator 34', a channel selector 35', a synchronization code adding circuit 36', a coder 37', a transmission/reception control information adding circuit 38', a transmit data buffer 39' and a microcomputer 47'.

The base station further comprises an antenna 11' for transmission and reception, an input network interface 64, an output network interface 65 and a microcomputer 66. Antenna 11' is used in common by transmitter-receiver units 61, 62 and 63.

Input network interface 64 is adapted to control data transfer from a network to transmitter-receiver units (61 to 63) and comprises four data buffers 76–79, four control information input buffers 80–83 and four control information inserting circuits 72–75, the numbers of which may be increased with an increase in the number of transmitter-receiver units. Input network interface 64 further comprises a microcomputer 71 and a multiplexer M11. Data input buffers 76 to 79 each accommodate a network interface of 64 Kbits/s. In control information input buffers 80 to 83 is stored control information corresponding to the D channel of the ISDN.

Control information inserting circuits 72 to 75 add data stored in control information input buffers 80 to 83 to data stored in data input buffers 76 to 79, and store them. Data stored in control information inserting circuits 72 to 75 is transferred to data transfer buffer 39' by multiplexer M11 as transmit information field I. The operations of data input buffers 76 to 79, control information input buffers 80 to 83, control information inserting circuits 72 to 75 and multiplexer M11 are all controlled by microcomputer 71.

Output network interface 65 controls data transfer from transmitter-receiver units (61 to 63) to the network, and comprises a multiplexer M12 and a microcomputer (not shown). The transmit information field I stored in receive data buffer 22' of transmitter-receiver unit 61 is transmitted to a control information extracting circuit selected by multiplexer M12, so that the final byte data block of transmit information field I is extracted. The extracted data block is transmitted to the network, via the control information output buffer, as control information. The data blocks other than the final byte data block in transmit information field I are transmitted to the network via the data output buffer.

The operations of transmitter-receiver units 61 to 63, input network interface 64 and output network interface 65 are all controlled by microcomputer 66.

In the base station, the transmission channel identification information TCH and free channel identification information RCH are produced by microcomputer 47'. The free channel identification information RCH produced by microcomputer 47' is controlled by microcomputer 66.

As described above, with this radiocommunication system, channel identification information TCH is added to each of a plurality of digital frames, and the digital frames are transmitted on a time division basis as a radio signal of a predetermined carrier frequency. For this reason, it becomes possible to transmit a plurality of channel signals simultaneously by means of a single carrier frequency. Hence, many communication channels can be realized within the same radio frequency band, permitting the effective use of frequencies.

Moreover, by properly selecting the number of channels to be transmitted simultaneously with a single carrier frequency, it is possible to achieve a desired data transmission rate. This permits a wider choice for a desirable data transmission rate according to the type of data to be transmitted. In addition, different kind of information can be transmitted simultaneously by the use of the data for D channel of the ISDN.

Since digital data can be transmitted from external equipment via an adapter into a terminal unit, the terminal unit can be used for every kind of data transmission of data other than moving image data (for example, a television telephone and a television conference apparatus) by connecting of the required equipment.

What is claimed is:

1. A radiocommunication system for performing bidirectional simultaneous communication, comprising:
   a base station having transmitting means for dividing each of a plurality of digital frames into a plurality of time slots and assigning a plurality of consecutive channel numbers to the time slots of each digital frame, each including a bit and frame synchronization field, an address field, a control field, a transmit information field, and a frame check and correct sequence field, and transmitting the time-division digital frames as a radio signal of a first frequency, and receiving means for receiving a radio signal of a second frequency; and
   a plurality of terminal stations each having receiving means for receiving the radio signal of the first frequency transmitted from the transmitting means of said base station and transmitting means for selecting at least one of said channels in said plurality of time-division digital frames to which said plurality of consecutive channel numbers are added and each of which has a frame structure which is the same as the frame structure of each of said time-division digital frames received from said base station, and transmitting the time-division digital frame of the selected channel to said base station as a radio signal of the second frequency.

2. A radiocommunication system according to claim 1, in which said base station further includes adding means for generating free channel identification information representing unused channels at the second frequency and adding the free channel identification information to each of said digital frames which are to be transmitted from said base station to each terminal station.

3. A radiocommunication system according to claim 2, in which each terminal station further includes detecting means for detecting unused channels at the second frequency on the basis of the free channel identification information contained in each of the digital frames transmitted from the transmitting means of said base station, to determine which of said channels is to be selected.

4. A radiocommunication system according to claim 1, in which each of the digital frames further includes a frame count field in which the channel number is contained.

5. A radiocommunication system according to claim 1, in which the transmit information field has a plurality of data blocks each of which comprises data of one byte.

6. A radiocommunication system according to claim 5, in which one data block of said transmit information field serves as control information between said base station and said terminal stations, and said one data block performs communication of the control information between said terminal stations and said base station while said base and terminal stations are transmitting target data using data blocks other than said one data block.

7. A radiocommunication system according to claim 1, in which said terminal stations perform bit and frame synchronization on the basis of said bit and frame synchronization field in the time-division digital frames transmitted from said base station.

8. A radiocommunication system according to claim 1, in which a transmission speed of data from said base station to said terminal stations depends upon the number of channels selected in the first frequency, and a transmission speed of data from said terminal stations to said base station depends upon the number of channels selected in the second frequency.

9. A radiocommunication system for performing bidirectional simultaneous communication, comprising:
   a first terminal station having transmitting means for dividing each of a plurality of digital frames into a plurality of time slots and assigning a plurality of consecutive channel numbers to the time slots of each digital frame, each including a bit and frame synchronization field, an address field, a control field, a transmit information field, and a frame check and correct sequence field, selecting at least one of the channels in the time-division digital frames, and transmitting the time-division digital frame of the selected channel as a radio signal of a first frequency;

a second terminal station having transmitting means for adding said plurality of consecutive channel numbers, which are periodically repeated, to said plurality of time-division digital frames, selecting at least one of the channels other than said selected at least one of the channels in the time-division digital frames, and transmitting the time-division digital frame of the selected channel as a radio signal of a first frequency;

a base station having receiving means for receiving and separating the time-division digital frames transmitted from said first and second terminals for each of the channels and recognizing channel numbers added to the channels selected by said first and second terminal stations, transmitting means for adding said plurality of consecutive channel numbers, which are periodically repeated, to said plurality of time-division digital frames, selecting a digital frame of the same channel as the channel selected by said first terminal station, transmitting the time-division digital frame of the selected channel to said first terminal station as a radio signal of a second frequency, selecting a digital frame of the same channel as the channel selected by said second terminal station, and transmitting the time-division digital frame of the selected channel of said second terminal station as a radio signal of the second frequency; and interface means provided on said base station, for transmitting and receiving digital data to and from a digital network to insert data or control information into the time-division digital frame.

10. A radiocommunication system for performing bidirectional simultaneous communication, comprising:

a base station having transmitting means for dividing each of a plurality of digital frames into a plurality of time slots and assigning a plurality of consecutive channel numbers to the time slots of each digital frame, each including a bit and frame synchronization field, an address field, a control field, a transmit information field, and a frame check and correct sequent field, and transmitting the time-division digital frames as a radio signal of a first frequency, and receiving means for receiving a radio signal of a second frequency; and a plurality of terminal stations each having receiving means for receiving the radio signal of the first frequency transmitted from the transmitting means of said base station, and recognizing and separating each channel from each digital frame, and transmitting means for selecting at least one of said channels in said plurality of time-division digital frames to which said plurality of consecutive channel numbers are added and each of which has a frame structure which is the same as the frame structure of each of said time-division digital frames received from said base station, and transmitting the time-division digital frame of the selected channel of said base station as a radio signal of the second frequency;

wherein the receiving means of said base station receives the time-division digital frames of the second frequency transmitting from the terminal stations and separates the time-division frames for each of the channels.

11. A radiocommunication system for performing bidirectional simultaneous communication, comprising:

a first terminal station having transmitting means for dividing each of a plurality of digital frame into a plurality of time slots and assigning a plurality of consecutive channel numbers to the time slots of each digital frame, each including a bit and frame synchronization field, an address field, a control field, a transmit information field and a frame check and correct sequence field, selecting at least one of the channels in the time-division digital frames, and transmitting the time-division digital frame of the selected channel as a radio signal of a first frequency;

a second terminal station having transmitting means for adding said plurality of consecutive channel numbers, which are periodically repeated, to said plurality of time-division digital frames, each including the bit and frame synchronization field, the address field, the control field, the transmit information field and the frame check and correct sequence field, selecting at least one of the channels other than said selected at least one of the channels in the time-division digital frames, and transmitting the time-division digital frame of the selected channel as a radio signal of the first frequency;

a base station having receiving means for receiving and separating the time-division digital frames transmitted from said first and second terminals for each of the channels and recognizing channel numbers added to the channels selected by said first and second terminal stations, transmitting means for adding said plurality of consecutive channel numbers, which are periodically repeated, to said plurality of time-division digital frames, each including the bit and frame synchronization field, the address field, the control field, the transmit information field and the frame check and correct sequence field, selecting a digital frame of the same channel as the channel selected by said first terminal station, transmitting the time-division digital frame of the selected channel to said first terminal station as a radio signal of a second frequency, selecting a digital frame of the same channel as the channel selected by said second terminal station, and transmitting the time-division digital frame of the selected channel to said second terminal station as a radio signal of the second frequency; and interface means provided on said base station, for transmitting and receiving digital data to and from a digital network to insert data or control information into the time-division digital frame.

12. A radiocommunication system according to claim 11, in which said base station further includes adding means for generating free channel identification information representing unused channels at the second frequency and adding the free channel identification information to each of said digital frames which are to be transmitted from said base station to each terminal station.

13. A radiocommunication system according to claim 12, in which each terminal station further includes detecting means for detecting unused channels at the second frequency on the basis of the free channel identification information contained in each of the digital frames transmitted from the transmitting means of said base station, to determine which of said channels is to be selected.

14. A radiocommunication system according to claim 11, in which each of the digital frames further includes a frame count field in which the channel number is contained.

15. A radiocommunication system according to claim 11, in which the transmit information field has a plurality of data blocks each of which comprises data of one byte.

16. A radiocommunication system according to claim 11, in which said terminal stations perform bit and frame synchronization on the basis of said bit and frame synchronization field in the time-division digital frames transmitted from said base station.

* * * * *

UNITED STATES PATENT AND TRADEMARK OFFICE
CERTIFICATE OF CORRECTION

PATENT NO. : 5,124,985
DATED : June 23, 1992
INVENTOR(S) : Toshiya Hoshikawa

It is certified that error appears in the above-indentified patent and that said Letters Patent is hereby corrected as shown below:

At column 1, line 52, before 'radiocommunication' insert --a--.

At column 2, line 41, delete "syste" and insert therefor --system--.

At column 8, line 50, delete "3" and insert therefor --38--.

At column 12, line 13, delete "5" and insert therefor --54--.

In claim 9, at column 15, line 30, delete the second occurrence of "of" and insert therefor --to--.

In claim 10, column 15, line 46, delete "sequent" and insert therefor --sequence--; line 62, delete the second occurrence of "of" and insert therefor --to--; line 67, delete "transmitting" and insert therefor --transmitted--.

UNITED STATES PATENT AND TRADEMARK OFFICE
CERTIFICATE OF CORRECTION

PATENT NO. : 5,124,985
DATED : June 23, 1992
INVENTOR(S) : Toshiya Hoshikawa

It is certified that error appears in the above-indentified patent and that said Letters Patent is hereby corrected as shown below:

In claim 11, at column 16, line 6, delete "frame" and insert therefor -- frames --.

Signed and Sealed this

Nineteenth Day of October, 1993

*Attest:*

BRUCE LEHMAN

*Attesting Officer*     *Commissioner of Patents and Trademarks*